United States Patent [19]

Kaincz et al.

[11] Patent Number: 5,193,980
[45] Date of Patent: Mar. 16, 1993

[54] HOLLOW TURBINE BLADE WITH INTERNAL COOLING SYSTEM

[75] Inventors: Christian Kaincz, Le Mee sur Seine; Georges Mazeaud, Yerres; Carmen Miraucourt, Brie Comte Robert; Didier M. Mortgat, Combs la Ville, all of France

[73] Assignee: Societe Nationale d'Etude et de Construction de Moteurs d'Aviation "S.N.E.C.M.A.", Paris, France

[21] Appl. No.: 828,104

[22] Filed: Jan. 30, 1992

[30] Foreign Application Priority Data

Feb. 6, 1991 [FR] France .................. 91 01305

[51] Int. Cl.⁵ ............................ F01D 5/18
[52] U.S. Cl. ........................ 416/97 R; 415/115
[58] Field of Search ......... 415/115, 116; 416/96 R, 416/96 A, 97 R

[56] References Cited

U.S. PATENT DOCUMENTS

| | | |
|---|---|---|
| 2,906,495 | 9/1959 | Schum et al. |
| 2,977,089 | 3/1961 | McCarty et al. |
| 3,191,908 | 6/1965 | Powell et al. ............... 416/96 R |
| 4,257,737 | 3/1981 | Andress et al. ............. 415/115 |
| 4,312,624 | 1/1982 | Steinbauer, Jr. et al. |
| 4,416,585 | 11/1983 | Abdel-Messeh ............ 416/97 R |
| 4,507,051 | 3/1985 | Lesgourgues et al. ...... 416/97 R |
| 4,514,144 | 4/1985 | Lee ........................... 416/97 R |
| 4,859,141 | 8/1989 | Maisch et al. |
| 5,052,889 | 10/1991 | Abdel-Messeh ............ 415/115 |

FOREIGN PATENT DOCUMENTS

| | | |
|---|---|---|
| 2150475 | 4/1973 | France . |
| 0135606 | 7/1985 | Japan .................. 416/96 A |
| 2107405 | 4/1983 | United Kingdom . |
| 2159585 | 12/1985 | United Kingdom . |

OTHER PUBLICATIONS

Patent Abstracts of Japan, vol. 7, No. 133 (M-221) (1278), Jun. 10, 1983, & JP-A-58-48702, Mar. 22, 1983, S. Kobayashi, "Air Cooled Vane in Gas Turbine".

*Primary Examiner*—Edward L. Look
*Assistant Examiner*—Christopher Verdier
*Attorney, Agent, or Firm*—Oblon, Spivak, McClelland, Maier & Neustadt

[57] ABSTRACT

A hollow turbine blade equipped with a cooling system comprises a pair of internal partitions connected to the intrados and extrados walls of the blade and dividing the interior of the blade into at least one internal cavity extending from the root end to the tip end of the blade, a median partition connected to the two internal partitions to divide the cavity defined between the two internal partitions into two half-cavities, the median partition leaving an aperture at or near one end of the blade to establish communication between the two half-cavities, air inlet holes opening into the half-cavity on the intrados side of the median partition at or near the other end of the blade, air flow disturbing regions disposed on at least part of the internal face of the intrados wall opposite the median partition, and air outlet holes provided in the extrados wall opposite the median partition. Preferably each half-cavity is divided into two passages by half-partitions extending between the median partition and the intrados and extrados walls from root to tip of the blade.

10 Claims, 4 Drawing Sheets

HOLLOW TURBINE BLADE WITH INTERNAL COOLING SYSTEM

BACKGROUND OF THE INVENTION

1. Field of the Invention

The invention relates to a hollow turbine blade equipped with an internal cooling system, and is particularly concerned with a blade intended primarily, but not exclusively, for the turbine of an aircraft engine, the blade being provided in one of its internal cavities with arrangements for cooling the outer walls of this part of the blade.

2. Summary of the Prior Art

Industrial and commercial competition leads aircraft engine manufacturers to seek constantly to improve the performance and output of their engines. These parameters may be improved, in particular, by increasing the temperature of the gases at the inlet of the turbine. One of the parts of the turbine most stressed by increasing the input temperature is the guide of the first stage of the turbine. It is therefore imperative to effect proper cooling of the blading constituting the guide. Conventionally, this cooling is effected by internal circulation of cooling air in cavities provided inside the blade.

The published French Patent Application FR-A-2 150 475 discloses a hollow turbine blade in which an insert is mounted to form a central partition held on both sides by ribs protruding from the internal faces of the blade walls. The cooling fluid admitted at one end of the blade follows a spiralling path on both sides of the central partition as a result of the presence of the ribs.

In U.S. Pat. No. 4,312,624 a turbine blade is disclosed in which an inner jacket is placed within the blade to define two compartments. Cooling air is admitted at one end of each of the compartments and leaves through holes provided at the other end of each compartment.

U.S. Pat. No. 4,859,141 discloses another turbine blade which is cooled with the aid of a jacket mounted within the blade cavity.

All the known arrangements mentioned above suffer from the drawback of requiring a delicate assembly of a jacket or partition inside the turbine blade. In addition, these arrangements do not achieve a flow of cooling air inside the turbine blade which enables satisfactory results to be obtained.

To overcome these drawbacks it is an object of the invention to provide a turbine blade equipped with a cooling system which does not complicate significantly the construction of the turbine blade and which leads to an improvement of the efficiency of the cooling produced by the flow of air inside the blade, both with respect to the intrados wall and to the extrados wall of the blade.

SUMMARY OF THE INVENTION

To this end, according to the invention there is provided a hollow turbine blade equipped with a cooling system, said blade comprising an intrados wall, an extrados wall, first and second ends respectively defining the root and the tip of said blade, two internal partitions connected to said intrados and extrados walls and dividing the interior of said blade into at least one internal cavity extending from said root to said tip of said blade, a median partition connected to said two internal partitions to divide the internal cavity defined between said two internal partitions into two half-cavities, said median partition leaving an aperture in the proximity of one of said ends of said blade to establish communication between said two half-cavities separated by said median partition, air inlet holes opening into said half-cavity on the intrados side of said median partition in the proximity of the other of said ends of said blade, air flow disturbing means disposed on at least part of the internal face of said intrados wall opposite said median partition, and air outlet holes provided in said extrados wall opposite said median partition.

As will be understood, owing to the presence of the median partition the cooling air flows first of all along the internal face of the intrados wall, then along the whole of the internal face of the extrados wall. In addition, because of the presence of the flow disturbing means on the internal face of the intrados wall, the heat exchange surface between this wall and the cooling air is increased, which improves the cooling effect. Furthermore, this same disturbing means produces turbulence in the cooling air in the vicinity of the wall, which also has the effect of improving the cooling of the wall.

Preferably, the turbine blade further comprises two transverse half-partitions connected to said median partition and respectively to said intrados and said extrados walls to divide each of said two half-cavities into two passages, each of said half-partitions extending from said first end to said second end of said blade. With this arrangement, the cooling air flows in the passages in the same way as described above. Other features and advantages of the invention will become apparent from the following description of several non-limitative embodiments with reference to the accompanying drawings.

DESCRIPTION OF THE PREFERRED EMBODIMENTS

Figure 1:
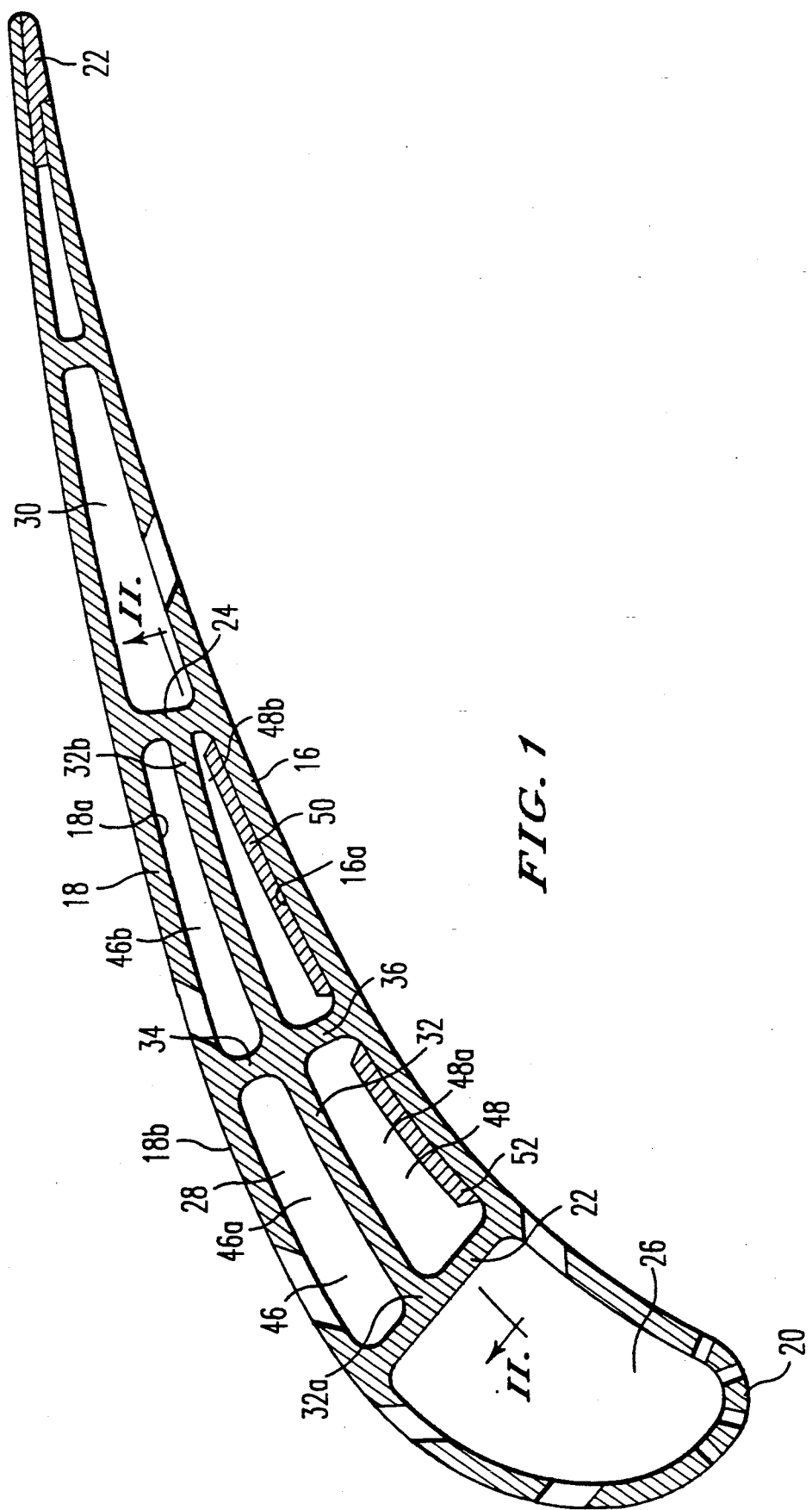
FIG. 1 is a cross-section of a first embodiment of a turbine blade equipped with a cooling system in accordance with the invention.
Figure 2:
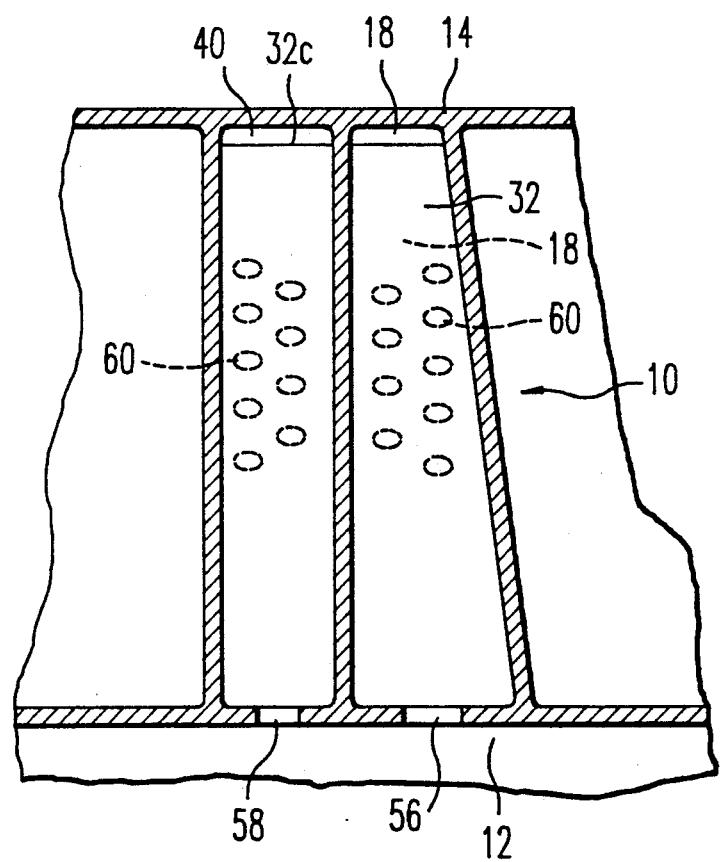
FIG. 2 is a vertical section through part of the blade of FIG. 1, taken along the line II—II in FIG. 1.

Referring first of all to FIGS. 1 and 2, a hollow blade 10 is shown which is, for example, an inlet stage blade of the guide of a gas turbine. The blade comprises a lower end or root 12 and an free upper end or tip 14. The blade 10 also has an intrados wall 16 and an extrados wall 18, these two walls 16 and 18 meeting to form a leading edge 20 and a trailing edge 22. The interior of the blade is separated into several cavities by internal partitions extending between the root 12 and the tip 14 of the blade, and in the embodiment shown two such partitions 22 and 24 form three cavities 26, 28 and 30.

The invention concerns the cooling of the central cavity 28 formed between the partitions 22 and 24. Within the cavity 28 there is a median partition 32, of which the edges 32a and 32b are fixed in a sealed manner to the internal partitions 22 and 24.

The median partition 32 divides the central cavity 28 into two half-cavities 46 and 48, the median partition 32 extending from the root 12 of the blade almost to the tip 14 where, as best shown in FIG. 2, the free edge 32c of the partition stops short of the tip 14 to leave a gap 40 through which the two half-cavities 48 and 46 are in communication.

In the embodiment shown in FIGS. 1 and 2, there are also two transverse half partitions 34 and 36, the half-partition 34 extending in the half-cavity 46 between the extrados wall 18 and the median partition 32, and the half-partition 36 extending in the half-cavity 48 between the median partition 32 and the intrados wall 16. The half-partitions 34 and 36 extend the entire height of the cavity 28 from root to tip of the blade, and divide each of the half-cavities 46 and 48 into two passages, referenced 46a,46b for the half-cavity 46 and 48a, 48b for the half-cavity 48. On the internal face 16a of the intrados wall 16 in each passage 48a,48b, disturbance elements 50 and 52 are disposed over at least part of the height of the blade. These disturbance elements will be described later in more detail.

As best seen in FIG. 2, air supply holes 56 and 58 are provided in the root of the blade to open into the passages 48b and 48a respectively. In the extrados wall 18 air outlet holes 60 are provided, these holes 60 communicating with both passages 46a and 46b.

It will thus be understood that the flow of cooling air inside the cavity 28 initiates from the passages 56 and 58 provided in the root of the turbine blade. Cooling air flows in the passages 48a and 48b, thus cooling the intrados wall 16, then through the end gap 40 into the passages 46a and 46b and out through the holes 60 provided in the extrados wall 18. In this way a cooling of the outer face of the extrados wall is obtained by the formation of cooling air films.

Preferably, the disturbance elements 52 and 50 are made by roughening the inner face 16a of the intrados wall. Alternatively these disturbance elements may be formed by ribs or a corrugated surface condition. In contrast, the inner face 18a of the extrados wall 18 is perfectly smooth to limit the pressure losses in the cavity and thus ensure a good distribution of the flow in the outlet holes 60. The disturbance elements increase the heat exchange surface between the cooling air and the intrados wall, which therefore improves the cooling of the wall. In addition, the disturbance elements promote air turbulence in the vicinity of the wall, which also improves the cooling of the wall.

Thus, a different cooling is obtained for the intrados wall 16 and for the extrados wall 18. In the case of the latter, the air issuing from the holes 60 forms cooling films on the outer face 18b of the extrados wall 18 to improve its cooling.

In the embodiment shown in FIGS. 1 and 2, the median partition 32 and the transverse half-partitions 34 and 36 are formed by casting at the same time as the remainder of the blade, and particularly at the same time as the internal partitions 22 and 24, so that they are formed integrally with the blade. As already indicated, the disturbance elements 52 and 50 are also formed when the blade is made. In this case, the minimum thickness of the partitions is 0.7 mm.

Figure 3:
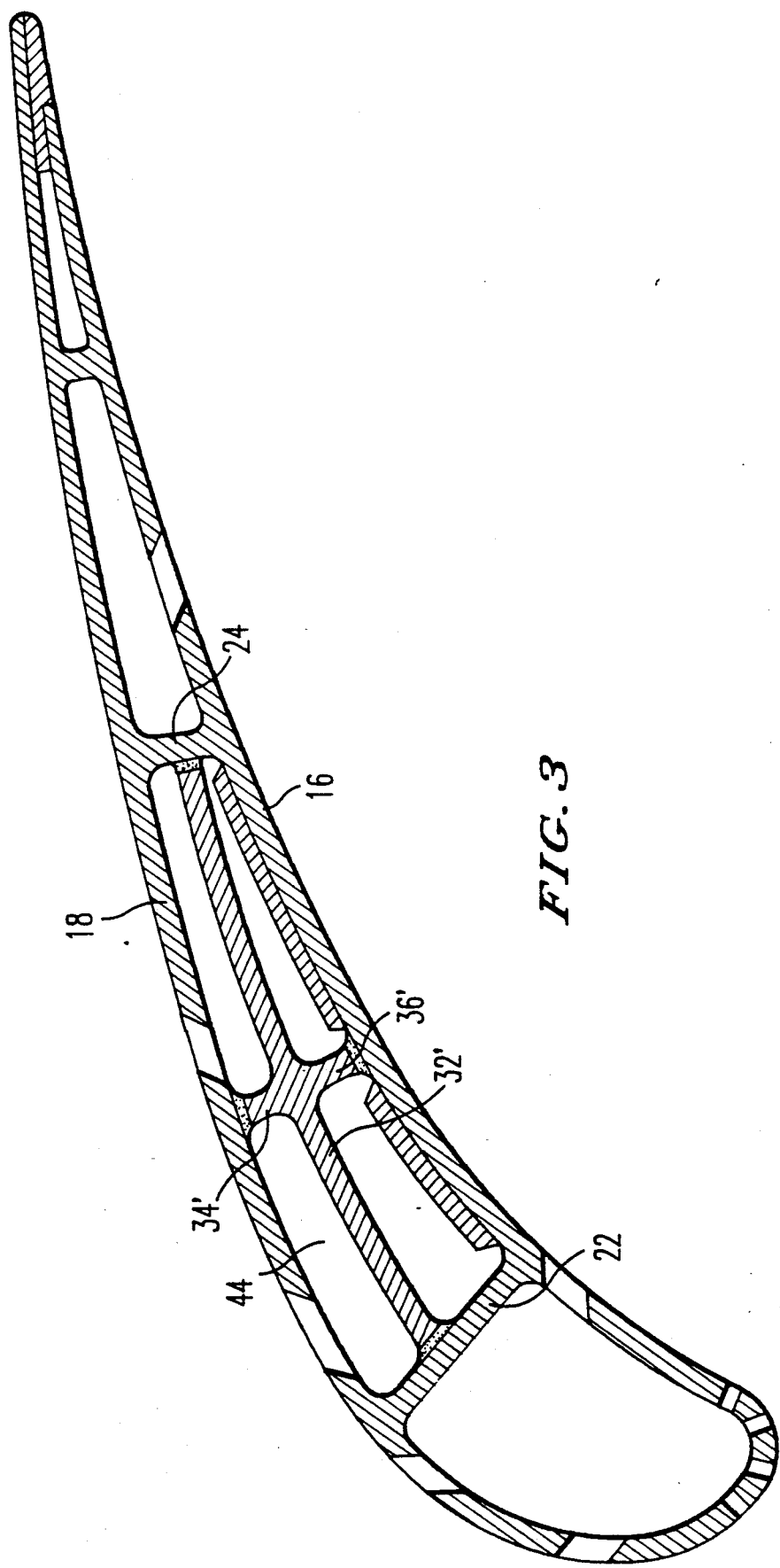
FIG. 3 is a view similar to that of FIG. 1, but showing an alternative embodiment.

The embodiment shown in FIG. 3 differs from that of FIGS. 1 and 2 in that the median partition, here referenced 32', and the two transverse half-partitions 34' and 36' are formed as a single part 70 separately from the remainder of the blade. This part 70, which is preferably made of sheet metal, is positioned in the central cavity 44 and the ends of the portion forming the median partition 32' are brazed to the internal partitions 22 and 24, and the ends of the portion forming the transverse half-partitions 34',36' are brazed to the intrados and extrados walls 16 and 18.

Figure 4:
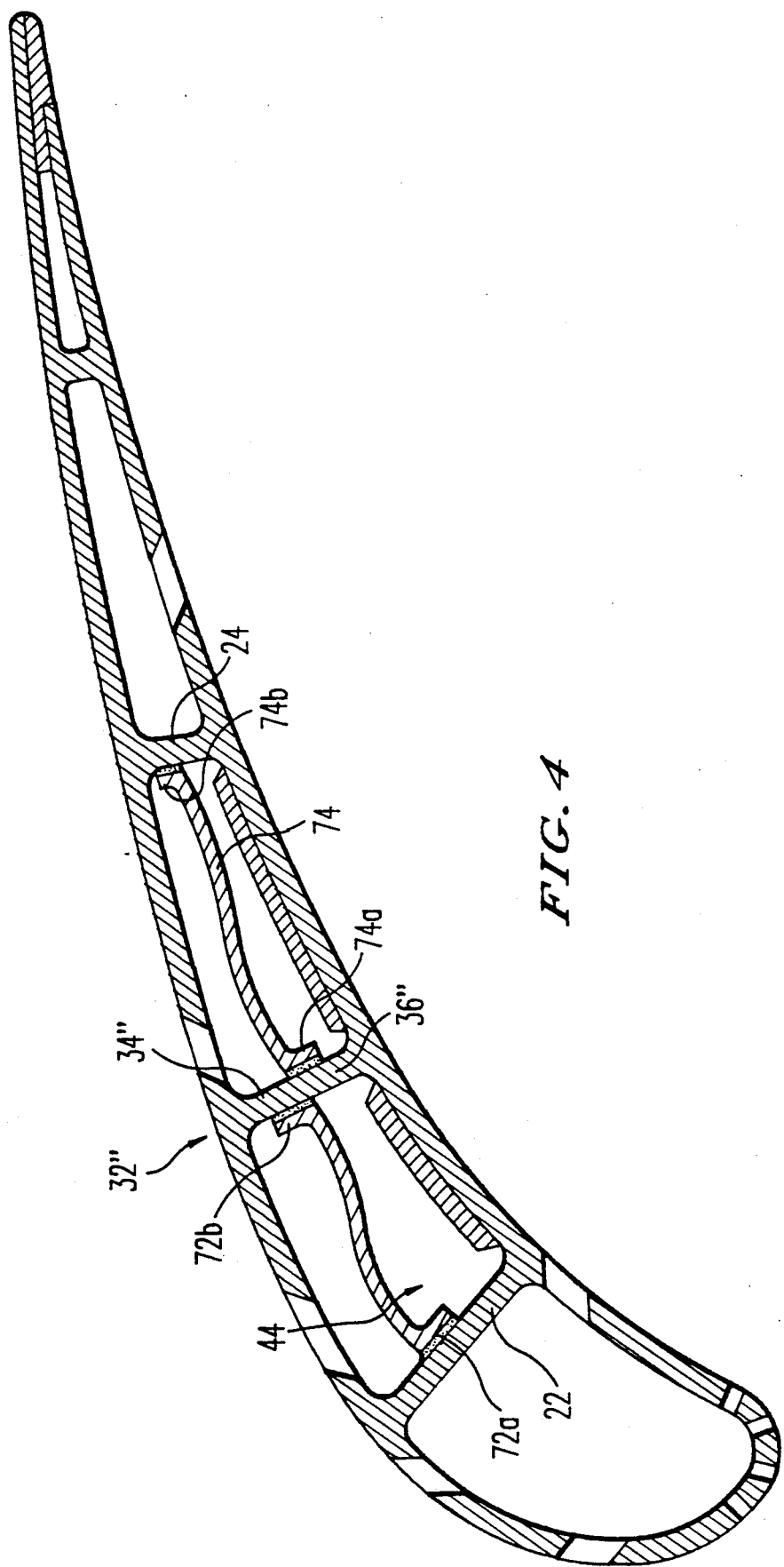
FIG. 4 is a view similar to that of FIGS. 1 and 3, but showing a third embodiment of the blade.

In the embodiment shown in FIG. 4, the two transverse half-partitions 36" and 34" are formed integrally by casting at the same time as the remainder of the blade. In other words, the two transverse half-partitions 34" and 36" together form a partition similar to the internal partitions 22 and 24. In this case the median partition, denoted here by 32", is formed by two half-plates 72 and 74. The ends 72a,72b of the half-plate 72 are respectively brazed to the internal partition 22 and the transverse half partitions 34",36", and the ends 74a,74b of the half-plate 74 are respectively brazed to the half-partitions 34",36" and the internal partition 24. Thus, the partitioning created for the central cavity 44 is functionally the same as that in the embodiments of FIGS. 1 and 3. The half-plates 72,74 have a thickness of the order of 0.4 mm.

In the foregoing embodiments each half-cavity 46,48 of the central cavity is separated into two longitudinal passages by the transverse half-partitions 34 and 36, thus defining two parallel paths for the cooling gas. This arrangement improves cooling by creating two parallel cooling circuits. However, it is to be understood that it is within the scope of the invention for the cooling system of the turbine blade not to be provided with the two transverse half-partitions. In this case, there is formed only a single circuit for the cooling air within the half-cavities 46 and 48.

We claim:

1. A hollow turbine blade equipped with a cooling system, said blade comprising an intrados wall, an extrados wall, first and second ends respectively defining a root and a tip of said blade, two internal partitions connected to said intrados and extrados walls and dividing the interior of said blade into at least one internal cavity extending from said root to said tip of said blade, a median partition connected to said two internal partitions to divide the internal cavity defined between said two internal partitions into two half-cavities, said median partition leaving an aperture in the proximity of one of said ends of said blade to establish communication between said two half-cavities separated by said median partition, air inlet holes opening into said half-cavity on the intrados side of said median partition in the proximity of the other of said ends of said blade, air flow disturbing means disposed on at least part of the internal face of said intrados wall opposite said median partition, and air outlet holes provided in said extrados wall opposite said median partition.

2. A turbine blade according to claim 1, further comprising two transverse half-partitions connected to said median partition and respectively to said intrados and said extrados walls to divide each of said two half-cavities into two passages, each of said half-partitions extending from said first end to said second end of said blade.

3. A turbine blade according to claim 2, wherein said disturbing means are disposed on the internal face of said intrados wall facing both passages of said half-cavity on the intrados side of said median partition, said air inlet holes open into both said passages of said intrados half-cavity, and said air outlet holes communicate with both passages of said half-cavity on the extrados side of said median partition.

4. A turbine blade according to claim 1, wherein said median partition is formed by casting at the same time as the remainder of said blade.

5. A turbine blade according to claim 1, wherein said median partition is formed as a separate part, said part having two edges which are secured in a sealed manner to said two internal partitions.

6. A turbine blade according to claim 2, wherein said median partition and said two transverse half-partitions are formed by casting at the same time as the remainder of said blade.

7. A turbine blade according to claim 2, wherein said median partition and said transverse half-partitions are formed as a single part which is secured in a sealed manner to said internal partitions and to said intrados and extrados walls.

8. A turbine blade according to claim 2, wherein said transverse half-partitions are formed by casting at the same time as the remainder of said blade, and said median partition is formed by two separate parts secured in a sealed manner to said transverse half-partitions and to said internal partitions.

9. A turbine blade according to claim 1, wherein said disturbing means are formed by a corrugated surface on the inner face of said intrados wall.

10. A turbine blade according to claim 1, wherein said disturbing means comprise roughening formed on the inner face of said intrados wall.

* * * * *